US007266754B2

(12) United States Patent
Shah et al.

(10) Patent No.: US 7,266,754 B2
(45) Date of Patent: Sep. 4, 2007

(54) DETECTING NETWORK DENIAL OF SERVICE ATTACKS

(75) Inventors: Pritam Shah, Sunnyvale, CA (US); Chengelpet Ramesh, San Jose, CA (US); Vamsidhar Valluri, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 795 days.

(21) Appl. No.: 10/641,494

(22) Filed: Aug. 14, 2003

(65) Prior Publication Data

US 2005/0039104 A1 Feb. 17, 2005

(51) Int. Cl.
*H03M 13/00* (2006.01)
(52) U.S. Cl. .................. 714/776; 726/13; 726/23; 709/229; 370/392; 370/401; 713/154
(58) Field of Classification Search ............... 714/776; 370/392, 401, 229; 726/13, 23; 709/229; 713/154
See application file for complete search history.

(56) References Cited

U.S. PATENT DOCUMENTS

| 7,013,482 | B1* | 3/2006 | Krumel ................ 726/13 |
| 2002/0101819 | A1* | 8/2002 | Goldstone ............ 370/229 |
| 2002/0145976 | A1 | 10/2002 | Meyer et al. |
| 2003/0154399 | A1 | 8/2003 | Zuk et al. |
| 2003/0191844 | A1 | 10/2003 | Meyer et al. |
| 2004/0052234 | A1 | 3/2004 | Ameigeiras et al. |

OTHER PUBLICATIONS

Cisco Systems, Inc., "Configuring TCP Internet (Prevent Denial-of-Service Attacks," pp. SC-189-SC-194.
Cisco Systems, Inc., "TCP Intercept Commands," Cisco IOS Command Summary, vol. 1 of 2, pp. CS1-817-CS1-820.
Cisco Systems, Inc., "ip tcp intercept drop-made," Cisco IOS Security Command Reference, SR-399-SR-412.
Cisco Systems, Inc., "Establishing Security Components," Chapter 8, Cisco SS7 Interconnect for Voice Gateways 2.0 Implementation Guide, pp. 8-1-8-6.
Stewart, R. "Transmission Control Protocol Security Considerations," Network Working Group Internet Draft, Apr. 19, 2004, 11 pages.
International Searching Authority, "Notification of Transmittal of the International Search Report and the Written Opinion of the International Searching Authority, or the Declarations," PCT/US05/00551, dated May 26, 2006, 7 pages.
Current Claims, PCT/US05/00551, 4 pages.

* cited by examiner

*Primary Examiner*—Guy J. Lamarre
(74) *Attorney, Agent, or Firm*—Hickman Palermo Truong & Becker LLP

(57) ABSTRACT

A method for detecting a suspicious packet flow in a packet-switched network comprises the computer-implemented step of receiving a first packet in which the SYN bit but not the ACK or RST bit of the packet's TCP header is set. If a specified first time has elapsed, a packet counter associated with the destination address of the flow is incremented. A determination as to whether the packet counter is greater than a specified threshold values is made. If the packet counter is greater than the threshold value, a notification message is generated. In one embodiment, information identifying a packet flow is aggregated to an aggregation cache based on the destination address of the flow.

38 Claims, 12 Drawing Sheets

DETECTING NETWORK DENIAL OF SERVICE ATTACKS

FIELD OF THE INVENTION

The present invention generally relates to computer networks. The invention relates more specifically to detecting network denial of service attacks.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The Internet has become an important tool for businesses and consumers alike. Businesses use the Internet to improve overall efficiency. For example, businesses can use the Internet to share critical data with remote offices or to enhance communications with business partners. Consumers use the Internet to enrich their lives. For example, consumers use the Internet to purchase goods and services from the comfort of their own homes or to find and use the vast amount of information that is available on the Internet. As both businesses and consumers utilize the Internet more and more, it is more important than ever that the Internet is protected from disruption by malicious entities via denial of service attacks ("DoS"). DoS attacks deprive legitimate users of access to services on the Internet, and have been used successfully to disrupt legitimate user access to websites such as Yahoo and CNN.

One type of DoS attack takes advantage of the basic design of the Transmission Control Protocol ("TCP"), one of the foundational protocols of the Internet. This type of DoS attack, known as a SYN-flood DoS attack, exploits the fact that TCP requires a "three-way handshake" to establish a connection between a client and a server. In a SYN-flood attack, the attacker sends many SYN packets with unreachable or spoofed source addresses, in rapid succession, to the victim. The victim will store the incomplete connections in a backlog queue and attempt to complete the connections initiated by the SYN packets. However, because the source addresses of the SYN packets are unreachable or spoofed, the connections are never completed and the backlog queue accumulates until it is filled up to capacity with incomplete connections. Once the backlog queue is filled up, legitimate users can no longer connect to the victim. As a result, services on the victim are denied to legitimate users.

One possible approach in dealing with SYN-flood attacks is an "intercept" approach. In this approach, an intermediary intercepts SYN packets from a client. The intermediary attempts to establish a connection with the source of the SYN packet (which should be the client if the packet is a part of a legitimate connection attempt). If the connection establishment is successful, the intermediary establishes a connection with the server. The intermediary then merges the two connections together to form a connection between the client and the server. The intermediary also has aggressive timeouts that will terminate illegitimate connection requests quickly so that valid requests can still be serviced.

One implementation of the intercept approach is provided as the intercept mode in the TCP Intercept feature in IOS software made by Cisco Systems, San Jose, Calif.

However, this approach has numerous disadvantages. One problem is that this approach, by actively intercepting connection requests and establishing intermediate connections, adds additional latency to a connection attempt. Another problem is that this approach does not support TCP options that are negotiated on the TCP three-way handshake. Another problem is that this approach is inflexible. In the intercept approach, whenever an attack is suspected, the "attacking" connection is terminated. This may not be the best course of action in all instances, nor is this the action that an administrator will necessarily choose. An administrator may wish to monitor the suspected attack further, to gain a better understanding of the situation. In addition, the intercept approach does not provide the administrator with any additional info for analysis.

Another approach for is the "watch" approach. In this approach, the intermediary lets the SYN packets through to the server, but monitors the connection attempt until the connection is established or the attempt times out. If the attempt times out, the intermediary will terminate the attempt.

One implementation of the watch approach is provided as the watch mode in the TCP Intercept feature in IOS software made by Cisco Systems, San Jose, Calif.

While the watch approach is less intrusive than the intercept approach, it still has some disadvantages. One disadvantage is that it still terminates the attempt after the timeout rather than giving the administrator discretion on what action to take. This approach also provides no useful information to the administrator for analysis.

A third approach is to check the source address of a received SYN packet in a domain name server ("DNS"), to verify the existence of the address. This reverse DNS lookup approach also has some disadvantages. One disadvantage is that the source address may be a spoofed legitimate address rather than just an unreachable address. If the address is a spoofed address, the reverse DNS lookup will yield a positive response for the address even if the SYN packet is part of an attack. Thus, this approach may determine that a packet transmission is not an attack even though it actually is, i.e. a false negative. A second disadvantage is that the reverse DNS lookup introduces additional latency into the connection attempt. A third disadvantage is that this approach depends on a DNS system that is beyond the control of the administrator. If a connection to the DNS system or the DNS system itself is inoperative, this approach is useless.

Based on the foregoing, there is a clear need for a more passive and flexible way to detect SYN-flood DoS attacks and provide information to the administrator for analysis.

There is also a need for a way to detect another type of DoS attack, called a SYN-RST (syn-reset) attack. This attack involves sending a SYN packet and then a RST packet, or a SYN packet, a few extra packets to deceive the victim into determining that the connection attempt is legitimate, and then a RST packet. Many SYN-RST groups sent in succession may keep the victim server busy enough such that legitimate connection requests will not be serviced.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
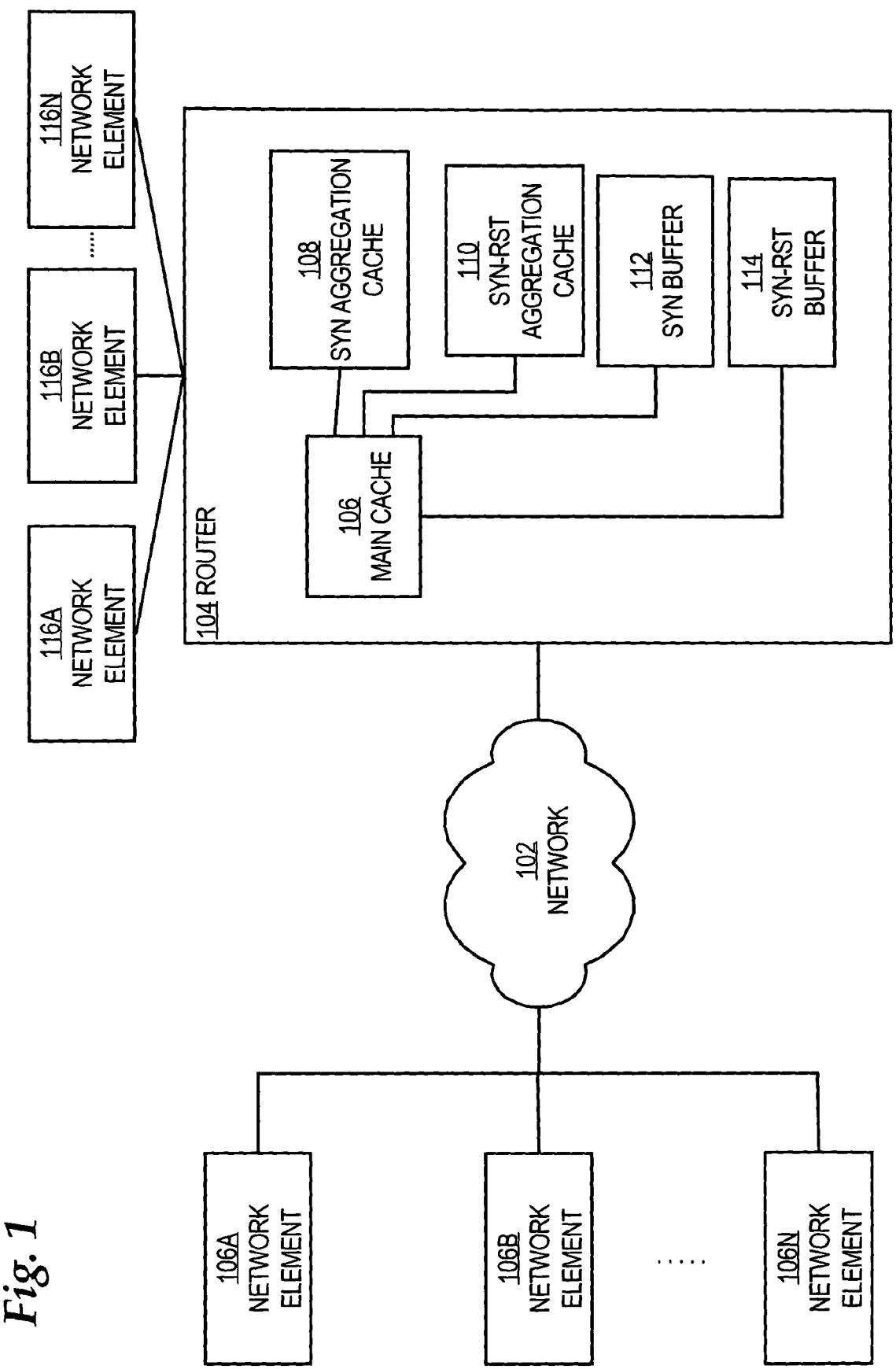
FIG. 1 is a block diagram that illustrates a high level overview of a system that may be used to practice a method for detecting SYN-flood DoS attacks.

A method and apparatus for detecting network denial of service attacks is described. In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

Embodiments are described herein according to the following outline:

1.0 General Overview
2.0 Structural and Functional Overview
3.0 Method of Detecting SYN-flood Denial of Service Attacks
   3.1 Receiving SYN Flows and Updating the SYN Aggregation Cache
   3.2 Receiving SYN-RST Flows and Updating the SYN-RST Aggregation Cache
   3.3 Receiving SYN and SYN-RST Flows and Updating the SYN and SYN-RST Aggregation Caches
   3.4 Comparing the Packet and Flow Counters Against Specified Thresholds
4.0 Implementation Mechanisms-Hardware Overview
5.0 Extensions and Alternatives 1.0 General Overview As an introduction only, the needs identified in the foregoing Background, and other needs and objects that will become apparent for the following description, are achieved in the present invention, which comprises, in one aspect, a method for detecting SYN-flood denial of service attacks comprising the computer-implemented steps of receiving a first packet of a packet flow in which the SYN bit but not the ACK or RST bits of the TCP header is set, incrementing a packet counter associated with the destination address of the flow when a first time has elapsed, determining if the packet counter is greater than a specified threshold value, and generating a notification message if the packet counter is greater than the specified threshold value.

According to one feature of this aspect, the method further comprises the step of canceling the increment of the packet counter in response to receiving a second packet in which the ACK bit of the TCP header is set. In another feature, information identifying the flow is cached in an aggregation cache that aggregates packet flows based on destination address. In another feature, the duration value for the first timer is received as a configurable parameter. In another feature, the notification message includes the source address and port, destination address and port, and protocol of the flow, and the packet counter. In another feature, the flow is expired from a network flow data cache when the first time has elapsed. In another feature, information defining the flow is logged in a buffer.

In yet another feature of this aspect, the method further comprises receiving a second packet of the flow in which the RST bit of the TCP header is set, determining a time difference between when the first packet was received and when the second packet was received, incrementing a flow counter associated with the destination address of the flow if the time difference is less than a specified global connection uptime value, determining if the flow counter is greater than a specified threshold value, and generating a notification message if the flow counter is greater than the specified threshold value.

In other aspects, the invention encompasses a computer apparatus and a computer-readable medium configured to carry out the foregoing steps.

2.0 Structural and Functional Overview

FIG. 1 is a block diagram that illustrates a high level overview of a system that may be used to practice a method for detecting SYN-flood DoS attacks comprising a network 102, network elements 106A–106N, 116A–116B, and router 104.

Network elements 106A–106N may be routers, switches, hubs, gateways, personal computers, workstations, servers, or other devices that are or can be connected to or communicate with a network 102. Each network element 106A–106N may be connected to additional network elements. The system shown in FIG. 1 is just one of many possible different configurations. Other embodiments may include fewer or more system components than those illustrated. Specifically, in a practical system there may be any number of network elements.

Router 104 is configured to receive and aggregate packet flows destined for the network elements for which a user wishes to detect SYN-flood or SYN-RST DoS attacks.

Router 104 includes network flow data cache or main cache 106, SYN aggregation cache 108, SYN-RST aggregation cache 110, SYN buffer 112, and SYN-RST buffer 114.

Router 104 also includes logic which, when executed, receives packet flows, updates information about packet flows in main cache 106, determines whether a flow is a SYN flow or a SYN-RST flow, aggregates SYN flows into SYN aggregation cache 108 based on destination address, aggregates SYN-RST flows into SYN-RST aggregation cache 110 based on destination address, and expires flows from main cache 106 into either SYN buffer 112 or SYN-RST buffer 114.

SYN buffer 112 is a buffer where records containing information about SYN packet flows are stored. SYN-RST buffer 114 is a buffer where records containing information about SYN-RST packet flows are stored. If router 104 is configured to detect only SYN-flood attacks, SYN-RST aggregation cache 110 and SYN-RST buffer 114 may be omitted. If router 104 is configured to only detect SYN-RST attacks, SYN aggregation cache 108 and SYN buffer 112 may be omitted. In some embodiments, SYN buffer 112 and/or SYN-RST buffer 114 may be implemented using a first-in-first-out (FIFO) queue. In some embodiments, the caches, buffers, and logic may be implemented using the NetFlow technology developed by Cisco Systems, San Jose, Calif.

Router 104 is communicatively coupled to network elements 116A–116N. Network elements 116A–116N may be routers, switches, hubs, gateways, personal computers, workstations, servers, or other devices that are or can be connected to or communicate with a network. Each network element 116A–116N may be connected to additional network elements.

In the system of FIG. 1, network elements 116A–116N represent the network elements for which a user wishes to detect SYN-flood or SYN-RST DoS attacks. Alternatively, the direction of packet flow from router 104 towards network 116A–116N represents the direction of packet flow for which router 104 receives and aggregates packet flows to detect SYN-flood or SYN-RST DoS attacks. Thus, router 104 is configured to receive packet flows destined for network elements 116A–116N, maintain records of such flows in main cache 106, and aggregate such flows in SYN aggregation cache 108 or SYN-RST aggregation cache 110 as appropriate. Packet flows in the opposite direction are not germane.

Network 102 may be a local area network (LAN), wide area network (WAN), one or more internetworks, or any other kind of network or subset thereof, in which the Transmission Control Protocol (TCP) is used to establish connections between network elements. Network 102 may contain additional network infrastructure elements such as routers, switches, etc. and other end station devices such as workstations, printers, servers, etc.

Each of network elements 106A–106N is communicatively coupled to network 102. Router 104 is also communicatively coupled to network 102. Network elements 116A–116N is communicatively coupled to router 104. Thus, network elements 106A–106N may communicate with network elements 116A–116N through network 102 and router 104.

Figure 2:
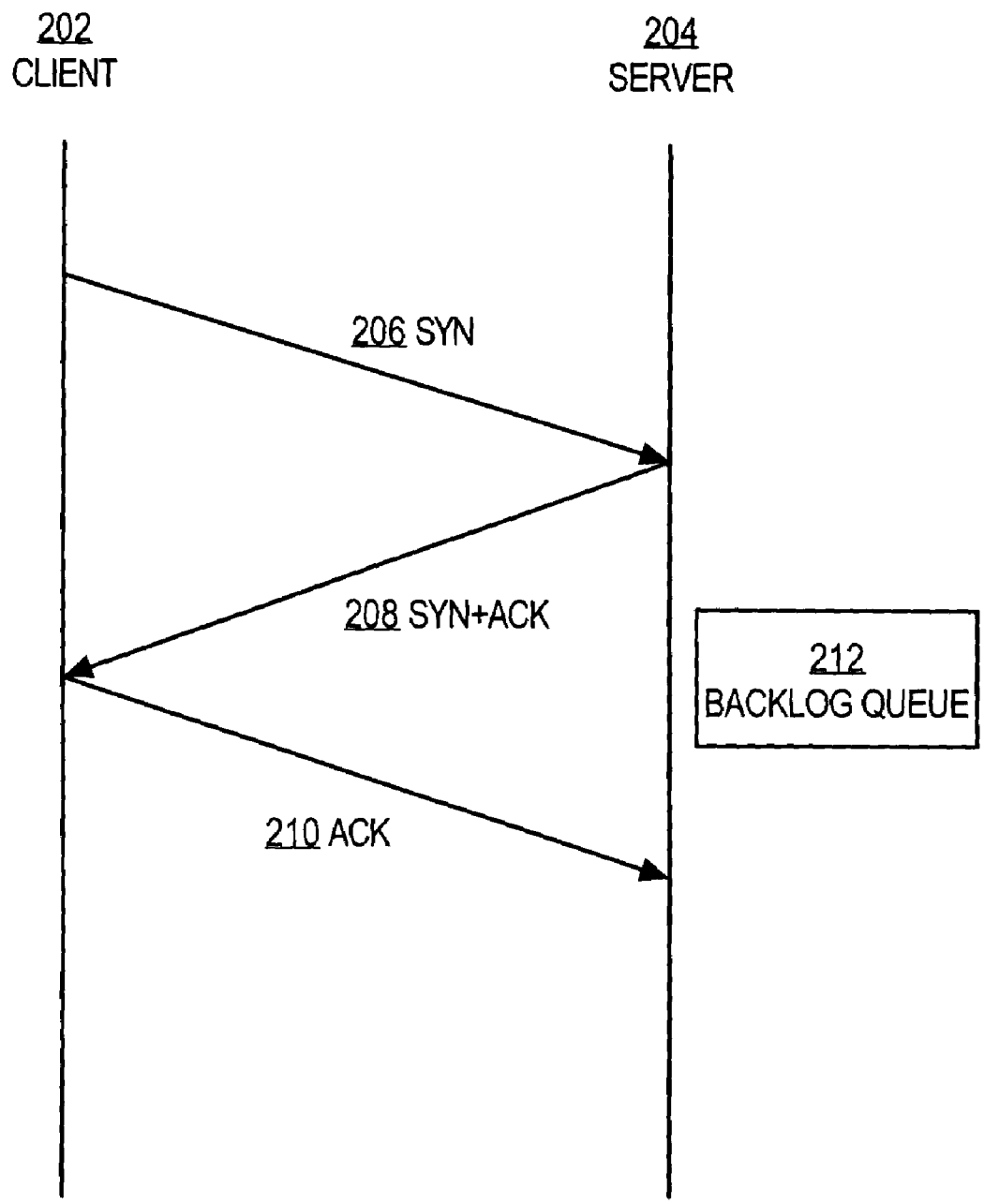
FIG. 2 is a packet transmission diagram that illustrates a TCP three-way handshake.

FIG. 2 is a packet transmission diagram that illustrates a TCP three-way handshake. Thus, FIG. 2 shows how a client establishes a connection with a server using TCP. The TCP three-way handshake allows the client and the server to synchronize packet sequence numbers so that data may be transmitted reliably. Client 202 first sends a SYN packet 206 to server 204. In SYN packet 206, the SYN bit of the TCP header is set, but the ACK and RST bits are not. After server 204 receives SYN packet 206, server 204 sends SYN-ACK packet 208 to client 202. Server 204 also enqueues information about the connection attempt initiated by SYN packet 206 into a backlog queue 212 and reserves other resources to service the attempt. In SYN-ACK packet 208, both the SYN and ACK bits of the TCP header are set, but the RST bit is not set.

After client 202 receives SYN-ACK packet 208, client 202 sends ACK packet 210 to server 204. In ACK packet 210, the ACK bit of the TCP header is set, but the SYN and RST bits are not set. After server 204 receives ACK packet 210, the connection is established and client 202 may begin sending data to server 204. The entry in backlog queue 212 corresponding to the connection is dequeued and resources that are no longer needed to service the connection are released.

Figure 3:
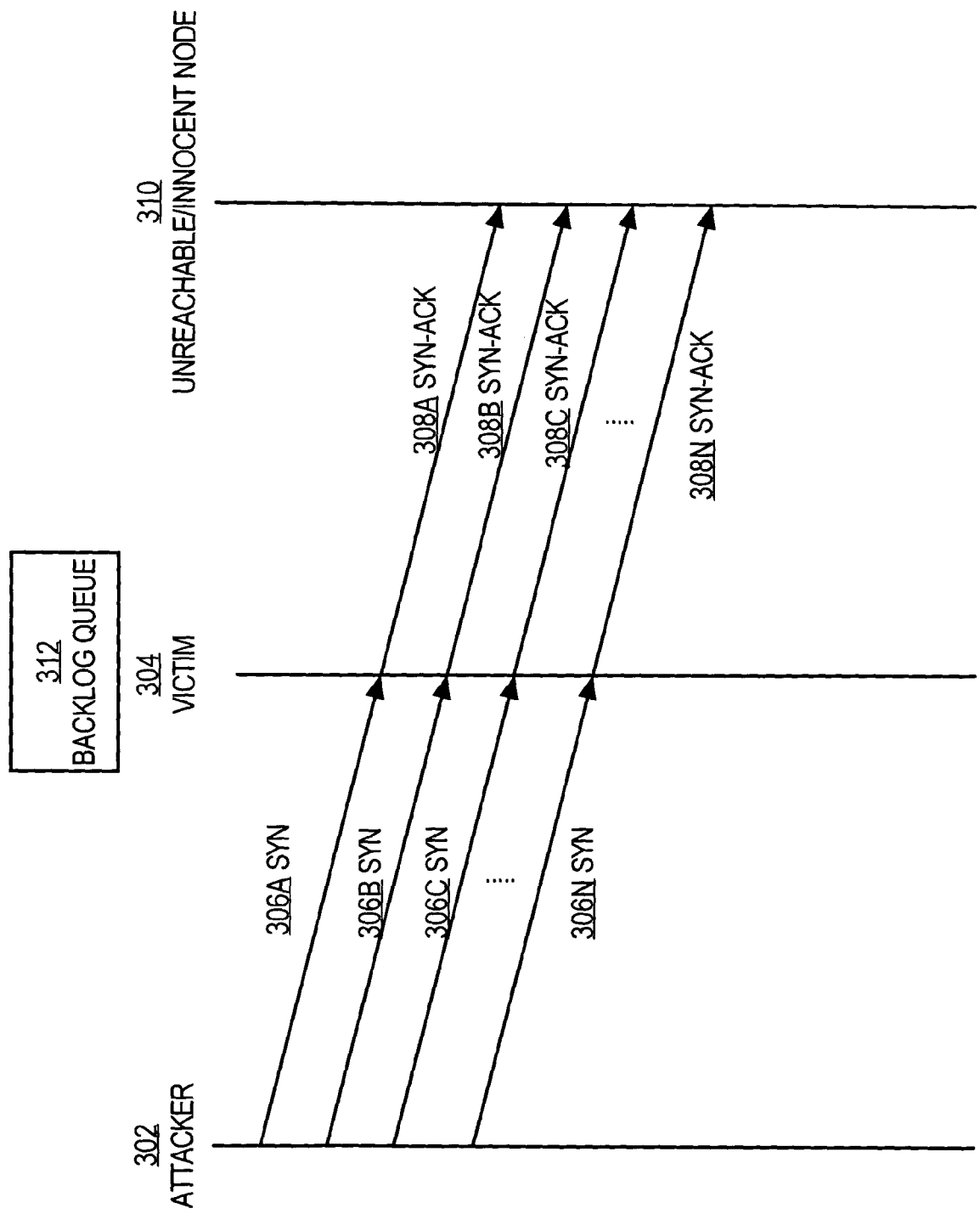
FIG. 3 is a packet transmission diagram that illustrates a SYN-flood DoS attack.

FIG. 3 is a packet transmission diagram that illustrates a SYN-flood DoS attack. Attacker 302 sends many SYN packets 306A–306N, in rapid succession, to victim 304. SYN packets 306A–306N all may be sent from the same network node or from a plurality of network nodes. SYN packets 306A–306N resemble SYN packets used for legitimate connection attempts, except that the source address field in SYN packets 306A–306N is not set to the address of attacker 302. Instead, the source address field is set to an unreachable address or a spoofed address of an innocent third network node. The unreachable or innocent address is shown as unreachable/innocent node 310 in FIG. 2.

After victim 304 receives SYN packets 306A–306N, it follows the normal TCP procedure and sends SYN-ACK packets 308A–308N, enqueues the attempts in backlog queue 312, and reserves resources for the attempts. However, because the SYN packets include the address of unreachable/innocent node 310 rather than attacker 302 as the source address, SYN-ACK packets 308A–308N are sent to unreachable/innocent node 310 rather than attacker 302. Victim 304 does not receive ACK packets responding to SYN-ACK packets 308A–308N because they do not specify victim 304 as the destination, in the case of an unreachable node, or they are ignored by the destination node, in the case of an innocent node.

As a result, the connection attempts initiated by SYN packets 306A–306N remain incomplete and are not dequeued from backlog queue 312. Although attempts that remain incomplete for a specified period of time can be purged from backlog queue 312, backlog queue 312 can be filled to capacity if attacker 302 sends SYN packets 306A–306N at a rate faster than the rate that backlog queue 312 purges incomplete attempts. With backlog queue 312 filled up and resources depleted, victim 304 can no longer accept connection requests from legitimate users.

Figure 4A:
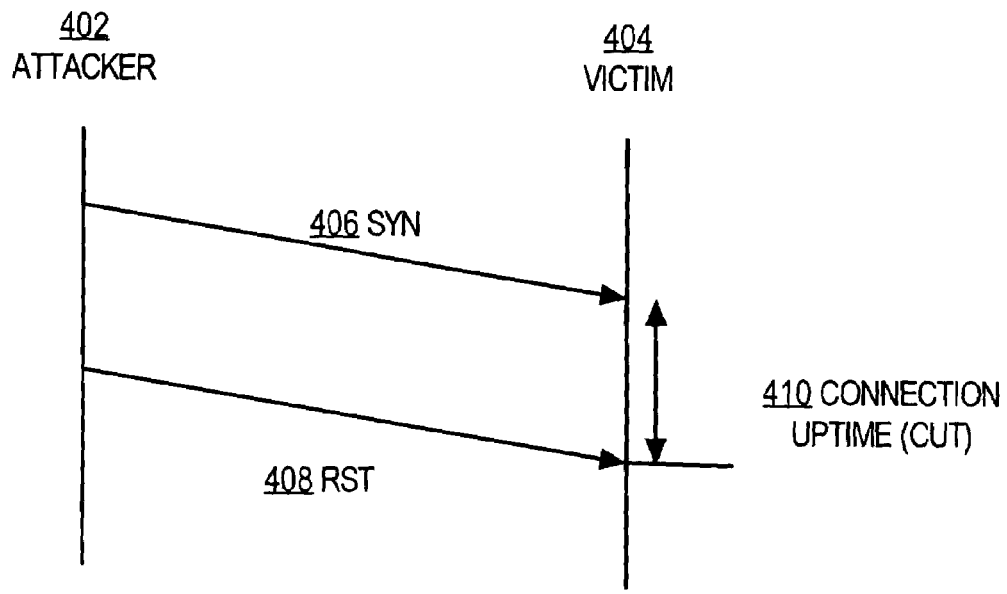
FIG. 4A is a packet transmission diagram that illustrates a SYN and RST packet group that may be a part of a SYN-RST DoS attack.

FIG. 4A shows a SYN and RST packet group that may be a part of a SYN-RST DoS attack. Generally, a SYN-RST DoS attack involves an attacker 402 sending to victim 404 a SYN packet 406 and shortly after a RST packet 408. A RST packet is generally used to abort a connection. If many of these SYN-RST groups are sent to the victim, the victim may be kept busy enough such that legitimate connection requests are not serviced.

One SYN-RST group that may be a part of a SYN-RST attack is shown in FIG. 4A. Attacker 402 sends a SYN packet 406 to victim 404. Attacker 402 then, very quickly, sends a RST packet 408. The time between when SYN packet 406 was received and when RST packet 408 was received is termed the connection uptime ("CUT") 410.

CUT 410 may be used as an indicator of whether the SYN-RST packet group is a part of an attack. Generally, if a SYN-RST packet group is a part of an attack, CUT 410 is very small.

Figure 4B:
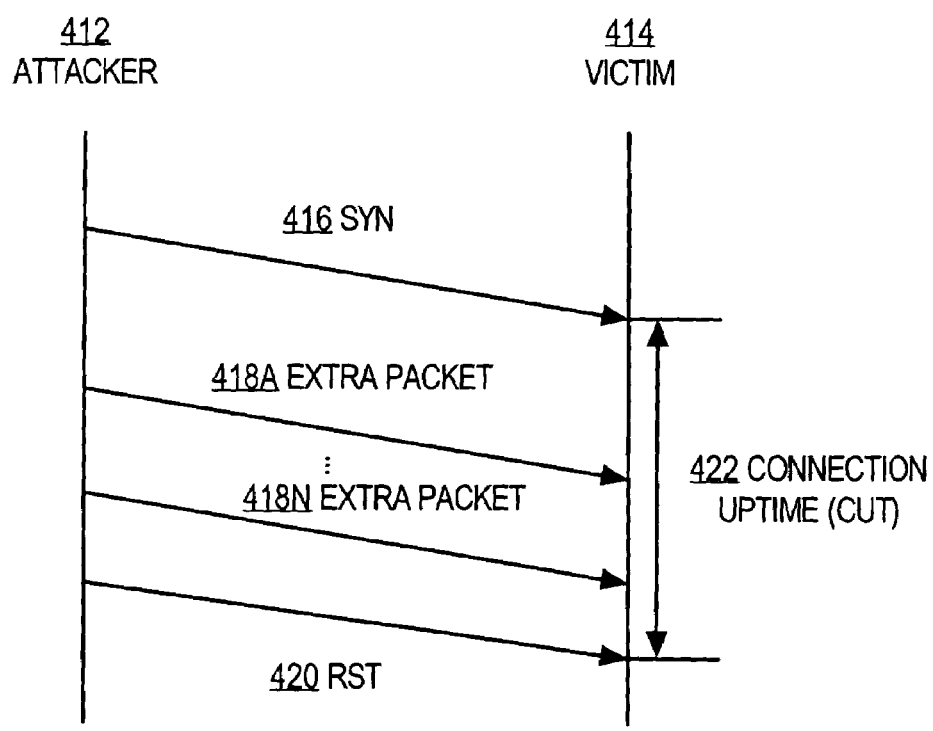
FIG. 4B is a packet transmission diagram that illustrates another SYN and RST packet group that may be a part of a SYN-RST DoS attack.

FIG. 4B shows another SYN and RST packet group that may be a part of a SYN-RST DoS attack. Attacker 412 sends SYN packet 416 and RST packet 420 to victim 414. Attacker 412 also sends extra packets 418A–418N after sending SYN packet 416 but before sending RST packet 420. Extra packets 418A–418N serve to fool victim 414 into believing that the connection attempt is legitimate. The number of extra packets 418A–418N sent, as well as CUT 422, may be used as an indicator of whether the SYN-RST packet group is a part of an attack. Generally, if the group is a part of an attack, then the number of extra packets 418A–418N sent is very small. If the number sent is zero, then the group is the same as that of FIG. 4A, in which case the CUT 422 indicates whether it is a part of an attack.

Thus, FIG. 3, FIG. 4A, and FIG. 4B show basic packet transmission patterns involved in SYN-flood or SYN-RST DoS attacks. More sophisticated attack patterns that utilize the same principles of filling up the backlog queue with multiple SYN packets or keeping the server occupied with multiple SYN-RST groups may be possible.

Figure 5:
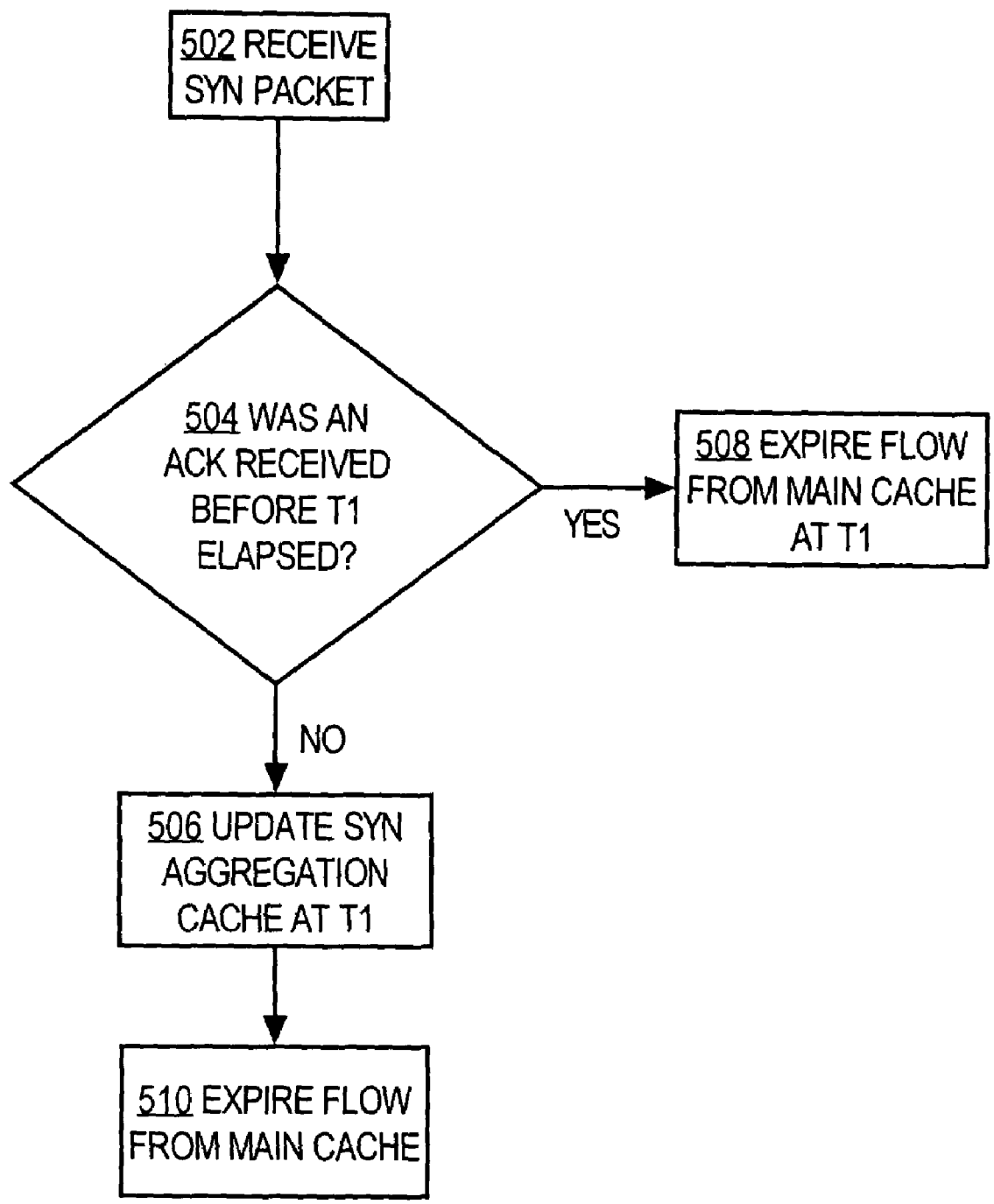
FIG. 5 is a flow diagram that illustrates an embodiment of a process for receiving SYN flows and updating a SYN aggregation cache.

3.0 Method of Detecting SYN-Flood Denial of Service Attacks 3.1 Receiving SYN Flows and Updating the SYN Aggregation Cache FIG. 5 is a flow diagram that illustrates an embodiment of a process for receiving SYN packet flows and updating a SYN aggregation cache.

A packet flow is a unidirectional sequence of packets with the same protocol, source address, source port, destination address, and destination port. A SYN packet flow ("SYN flow") is a packet flow that comprises of SYN packets. Detailed information about a flow is stored as a flow record in main cache 106 of FIG. 1, for example. Each flow record in main cache 106 may include information such as source address, source port, destination address, destination port, protocol, interface, a timestamp of the flow, and the number of packets in the flow. Other information may also be included in a flow record. The timestamp indicates the time the flow record was last updated, including the time when the record was first created.

Whenever a packet is received, main cache 106 is updated with the appropriate information. An update of main cache 106 may involve a creation of a new flow record in main cache 106, if a packet is the first packet of a flow that has no matching flow record in main cache 106, or an update of an existing flow record, if a packet is a part of a flow that has a matching flow record in main cache 106. Because main cache 106 records all inbound flows, main cache 106 may fill up to capacity. In some embodiments, space in main cache 106 may be cleared by expiring (i.e. removing) a flow record from main cache 106 after a timeout based on how long the flow record has not been updated (inactive timeout) and/or how long the flow record has been in main cache 106 (active timeout). If main cache 106 does fill up and flow records must be expired immediately to free up space, the oldest flow records may be expired.

In step 502, router 104 receives a first SYN packet of a flow. A corresponding flow record in main cache 106 is created or updated to account for the new SYN packet. Router 104 then waits for a time T1 to elapse, receiving any incoming packets that arrive before T1 elapses. T1 represents a time that a router should wait for an ACK packet corresponding to the SYN packet to arrive before assuming that the SYN packet is a part of an attack. In one embodiment, T1 is equal to the TCP exponential backoff. T1 may be a user-provided configurable parameter value. SYN flows in main cache 106 expire at T1 after the last SYN packet rather than the active or inactive timeouts.

In step 504, a determination is made as to whether an ACK packet of the same packet flow (i.e., packets having the same destination address and port, source address and port, and protocol) has been received after the SYN packet received in step 502 but before T1 has elapsed. If the determination in step 504 is that no ACK packet was received before the elapse of T1, then in step 506, when T1 has elapsed, router 104 updates SYN aggregation cache 108.

After updating SYN aggregation cache 108, in step 510 router 104 expires the corresponding flow record from main cache 106.

If the determination in step 504 is that an ACK packet was received before T1 elapsed, then in step 508, when T1 has elapsed, router 104 expires the corresponding flow record from main cache 106. The receipt of the ACK packet cancels the update of SYN aggregation cache 108 of step 506 that would otherwise be performed. If any additional ACK packets are received after the first ACK packet but before T1 has elapsed, they are ignored for the purposes of determining if an update of the SYN aggregation cache is needed. Additionally, when an ACK packet is received, main cache 106 is updated to reflect the new packet.

After the flow has expired from main cache 106 in step 506 or step 510, if ACK packets are received for the exact same flow, main cache 106 is updated with a new flow record. Otherwise, no action is taken until the new flow is expired normally (because the flow is not a SYN flow, T1 is not the expiration timeout) or SYN packets for the flow are received, which leads to creation of a new flow record in main cache 106.

If additional SYN packets for the same flow are received before T1 has elapsed, main cache 106 is still updated to reflect the receipt of the packets, but otherwise no update of SYN aggregation cache 108 is needed because the additional SYN packets do no additional harm.

A network node reserves a TCP connection block ("TCB") for each connection, which is denoted by the source address, destination address, and port numbers. Resources on the node are reserved to each TCB. Multiple SYN packets that are received for the exact same flow belong to the same TCB because the source and destination addresses, source and destination ports, and protocol are all the same. Thus, SYN packets subsequent to the first SYN packet do not tie up additional resources because the extra SYN packets, as a part of the same TCB as the first SYN packet, do not get assigned additional resources. Further, for purposes of updating SYN aggregation cache 108, subsequent SYN packets of the same flow may be ignored, up to a time when the flow expires from main cache 106.

SYN aggregation cache 108 aggregates flow records based on destination address. Thus, SYN flows from different source addresses or different ports that are destined for the same address are aggregated into one aggregated flow in SYN aggregation cache 108. By aggregating flows by destination address, SYN-flood attacks involving SYN packets sent from multiple nodes may be detected.

Each aggregated flow, which represents all SYN packet flows destined for a particular destination address, has an associated flow counter and packet counter. The flow counter represents the number of SYN flows destined for the destination address. The packet counter represents the number of SYN packets destined for the destination address. The packet counter tracks the number of unacknowledged SYN packets going to a destination address and is therefore an indicator of how many incomplete connection attempts are in the backlog queue of the victim node.

An update of SYN aggregation cache 108 may involve a creation of a new aggregated flow for a new destination address or an increment of the packet counter of a preexisting aggregated flow. The packet counter may also be decremented, if an ACK packet was received in some situations, to reflect a presumed successful connection establishment. Each aggregated flow in SYN aggregation cache 108 may also have an active timeout or inactive timeout so that it can be expired to free up cache space.

3.2 Receiving SYN-RST Flows and Updating the SYN-RST Aggregation Cache

Figure 6:
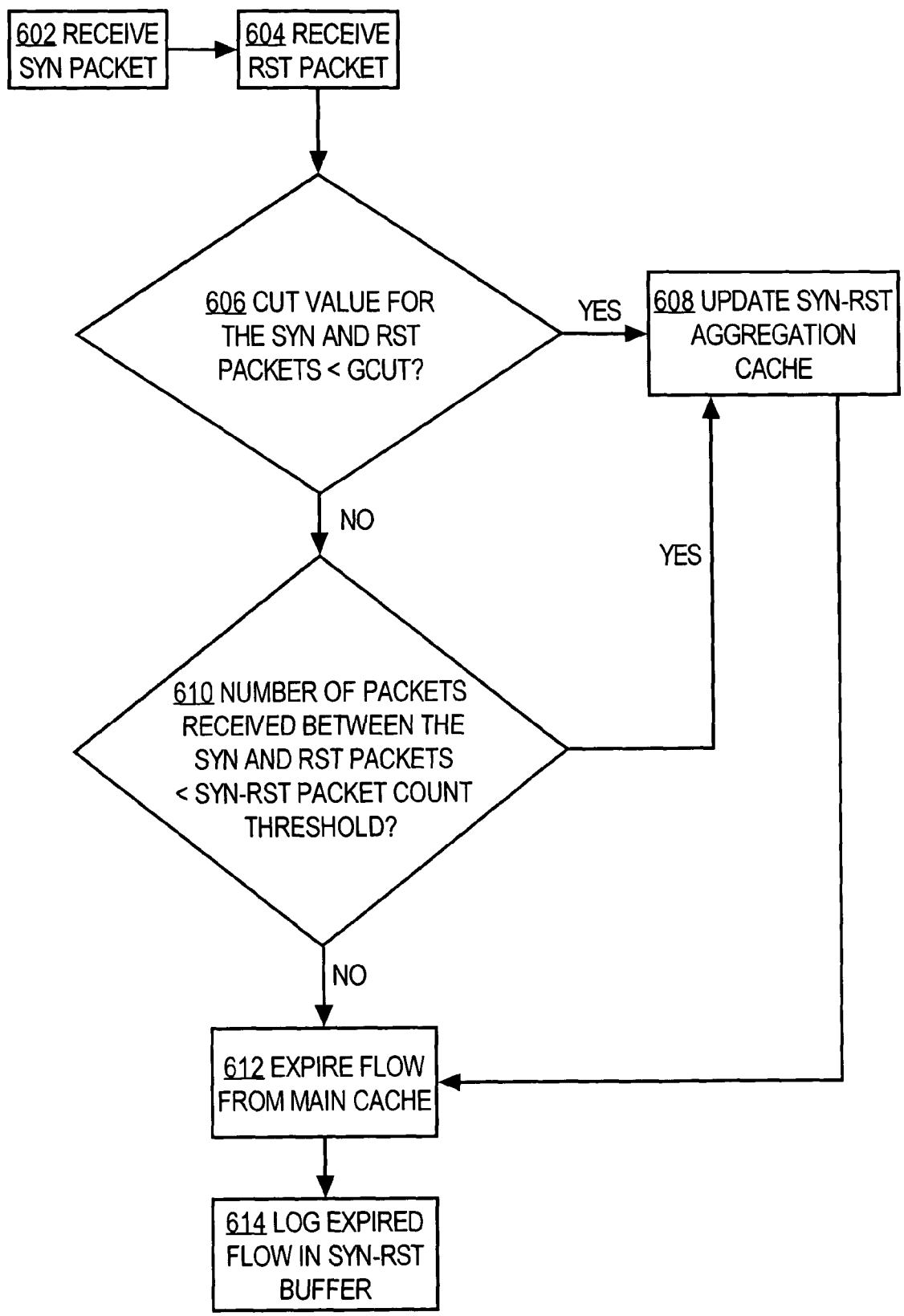
FIG. 6 is a flow diagram that illustrates an embodiment of a process for receiving SYN-RST flows and updating a SYN-RST aggregation cache.

FIG. 6 is a flow diagram that illustrates an embodiment of a process of receiving SYN-RST packet flows and updating the SYN-RST aggregation cache. A SYN-RST packet flow ("SYN-RST flow") is a packet flow that comprises of SYN packets and RST packets. Thus, a SYN-RST flow may comprise a SYN-RST group of the types shown in FIG. 4A or FIG. 4B, or a plurality of such groups.

In step 602, router 104 receives a first SYN packet. Router 104 updates main cache 106 to reflect the new packet. In step 604, router 104 receives a second RST packet of the same packet flow.

In step 606, router 104 determines a CUT 410 for the SYN packet and RST packet and compares CUT 410 against a global connection uptime value. The global connection uptime value ("GCUT") is a configurable parameter representing the minimum time difference between receipt of the SYN and receipt of the RST packet in order for the SYN-RST group to be considered as benign. If CUT 410 is less than or GCUT, in step 608 router 104 updates the corresponding aggregated flow in SYN-RST aggregation cache 110. After the update in step 608, in step 612 router 104 expires the flow from main cache 106. In step 612 router 104 logs the flow in SYN-RST buffer 114.

SYN-RST aggregation cache 110 also aggregates flows based on destination address. All SYN-RST groups destined for the same destination address are aggregated into one aggregated flow. Each aggregated flow in SYN-RST aggregation cache 110 also has an associated flow counter and packet counter. SYN-RST aggregation cache 110 is similar to SYN aggregation cache 108, but aggregates SYN-RST flows rather than SYN flows, and the value of interest to the user is the flow counter.

Because a SYN-RST attack is based on sending many SYN-RST packets groups rather than many SYN packets, tracking packet counts does not assist in the detection of a SYN-RST attack. Rather, tracking the number of SYN-RST packet flows going to destination address, which is the best way to count the number of SYN-RST groups from varying sources, is the way used to detect SYN-RST attacks. Thus, the flow counter of an aggregated flow in SYN-RST aggregation cache 110 is the value of interest. An update of SYN-RST aggregation cache 110 may involve a creation of a new aggregated flow for a new destination address or an increment of the flow counter of a preexisting aggregated flow.

If the determination in step 606 is that CUT 410 is less than the GCUT, then in step 610 router 104 determines the number of packets received between the SYN packet and the RST packet and compares that value against a SYN-RST packet count threshold. This determination is made to account for SYN-RST packet groups of the type shown in FIG. 4B. The SYN-RST packet count threshold represents the minimum number of packets received between the SYN packet and the RST packet in order for the group to be considered as benign.

If the number of packets received is less than the SYN-RST packet count threshold, router 104 proceeds to step 608, in which SYN-RST aggregation cache 110 is updated. From there, router 104 proceeds to step 612 and step 614 in sequence, in which the flow is expired from main cache 106 and logged in SYN-RST buffer 114. If the number of packets received is not less than the threshold, router 104 proceeds directly to step 612 and step 614.

After the flow has expired from main cache 106 in step 612, if RST packets are received for the exact same flow, main cache 106 is updated with a new flow record but otherwise no action is taken until the new flow is expired at the normal expiration timeout.

A sophisticated attacker may try to artificially inflate a SYN-RST packet group's CUT 410 by sending multiple SYN packets and then the RST packet. To account for this, in this process CUT 410 is measured as the time difference between receipt of the most recent SYN packet and receipt of the first RST packet. All SYN packets of the exact same flow that arrive after the first SYN packet but before a RST packet arrives still trigger updates of main cache 106.

3.3 Receiving SYN and SYN-RST Flows and Updating the SYN and SYN-RST Aggregation Caches The processes shown in FIG. 5 and in FIG. 6 may be integrated into one process. In an integrated process, a flow record is expired from main cache 106 and logged in SYN buffer 112 or SYN-RST buffer 114 after a certain time has elapsed from the last time the flow record is updated in main cache 106, rather than the normal active or inactive timeout. In one embodiment, that expiration time is the greater of T1 and GCUT. T1 and GCUT are used to determine the expiration timeout because these two time values enable the determination of whether a flow is a SYN flow or a SYN-RST flow. Because both T1 and GCUT are configurable, one value may be configured to be greater than the other, or they may be configured to be equal. Whether one value is greater than the other affects what steps are taken, as shown respectively in FIG. 7, FIG. 8, FIG. 9.

Figure 7:
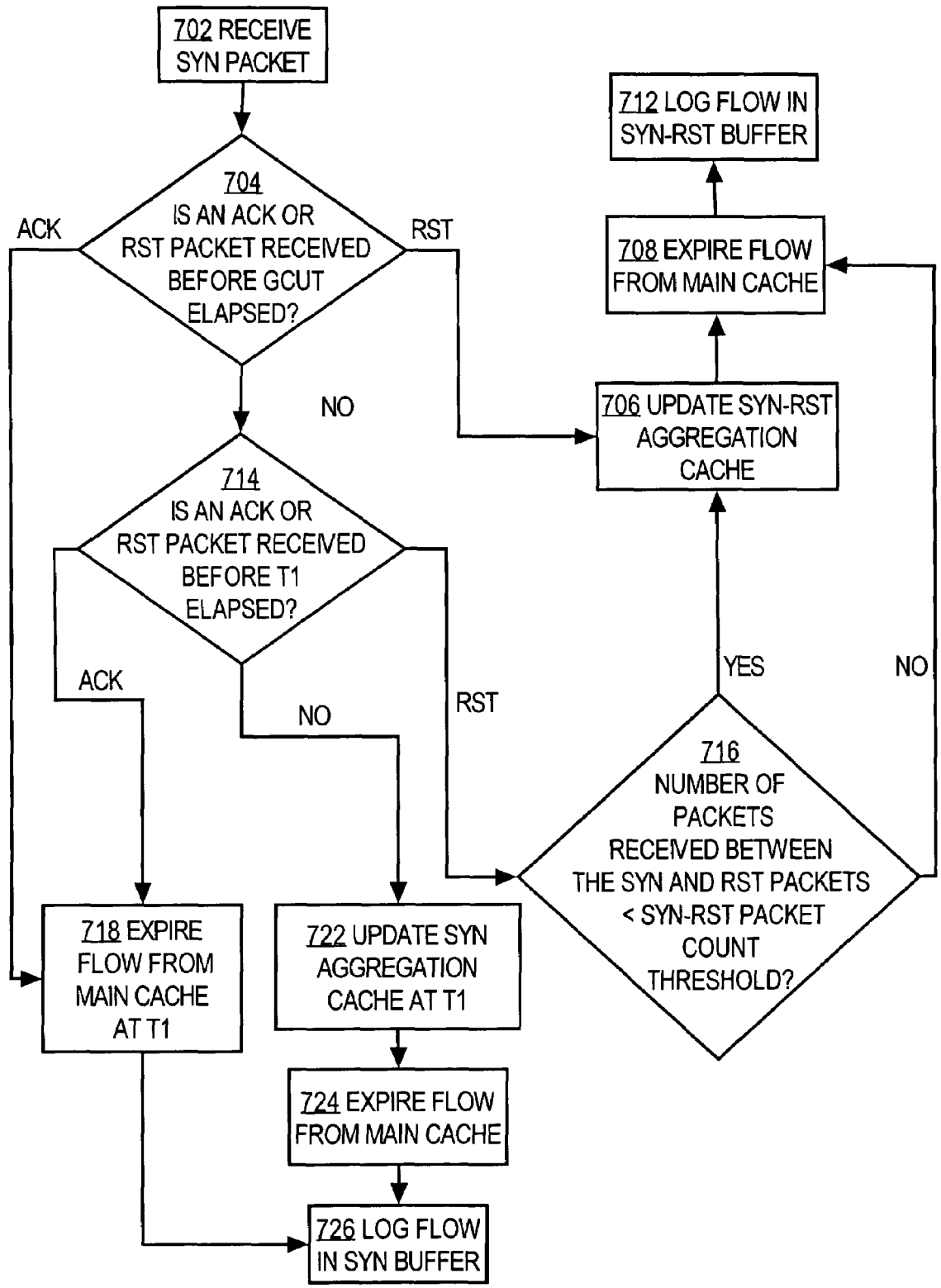
FIG. 7 is a flow diagram that illustrates an embodiment of a process for receiving SYN and SYN-RST flows and updating the SYN aggregation cache and SYN-RST aggregation cache, wherein the first timer is greater than the global connection uptime value.

FIG. 7 is addressed first. FIG. 7 is a flow diagram illustrating an embodiment for the process of receiving SYN and SYN-RST flows and updating the SYN and SYN-RST aggregation caches, wherein T1 is greater than GCUT.

In step 702, router 104 receives a first SYN packet of a flow. Main cache 106 is updated to reflect the new packet. Router 104 waits for GCUT to elapse from when the SYN packet was received in step 702.

In step 704, router 104 determines if an ACK or a RST packet of the same packet flow was received before GCUT has elapsed. If an ACK packet was received before GCUT elapsed, router 104 proceeds to step 718, where router 104 waits until T1 has elapsed from when the SYN packet was received in step 702, whereupon router 104 expires the flow from main cache 104. From there, router 104 proceeds to step 726, in which the flow is logged in SYN buffer 112. If more ACK packets were received, main cache 106 is updated but no additional action is needed. If ACK packets for the same flow were received after expiration of the flow from main cache 106, main cache 106 is updated to reflect the new flow but no action other than expiration of the flow at the normal timeout is performed.

In step 704, if the determination is that a RST packet was received before GCUT had elapsed, then router 104 proceeds to steps 706, 708, and 710 in sequence, in which router 104 updates SYN-RST aggregation cache 110, expires the flow from main cache 106, and logs the flow in SYN-RST buffer 114, respectively.

In step 704, if the determination is that no ACK or RST packet was received before GCUT elapsed, then router 104 waits until T1 has elapsed from then the SYN packet was received in step 702. At step 714, router 104 determines if an ACK or RST packet was received before T1 has elapsed. If the determination in step 714 is that an ACK packet was received, then the method proceeds to step 718 and step 726 in sequence, in which the flow is expired from main cache 106 and logged in SYN buffer 112, respectively.

If the determination in step 714 is that a RST packet was received, then in step 716 router 104 checks the number of packets received between the SYN packet and the RST packet against the SYN-RST packet count threshold. If the number of packets is less than the threshold, the method proceeds to steps 706, 708, and 712 in sequence. If the number of packets is greater than or equal to the threshold, then router 104 proceeds to steps 708 and 712 in sequence.

If the determination in step 714 is that no ACK or RST packet was received by the time T1 elapsed, router 104 proceeds to step 722, in which SYN aggregation cache 108 is updated. In steps 724 and 726 the flow is expired from main cache 106 and logged in SYN buffer 112.

After the flow expires from main cache 106, ACK or RST packets of the same flow received are reflected in main cache 106 in new flow records, but otherwise no action is taken except for expiration of the new flow at the normal timeout.

If additional SYN packets of the same flow are received before the expiration of the flow, main cache 106 is still updated. But, for purposes of incrementing the packet counter of the corresponding aggregated flow in SYN aggregation cache 108, the extra SYN packets may be ignored.

Figure 8:
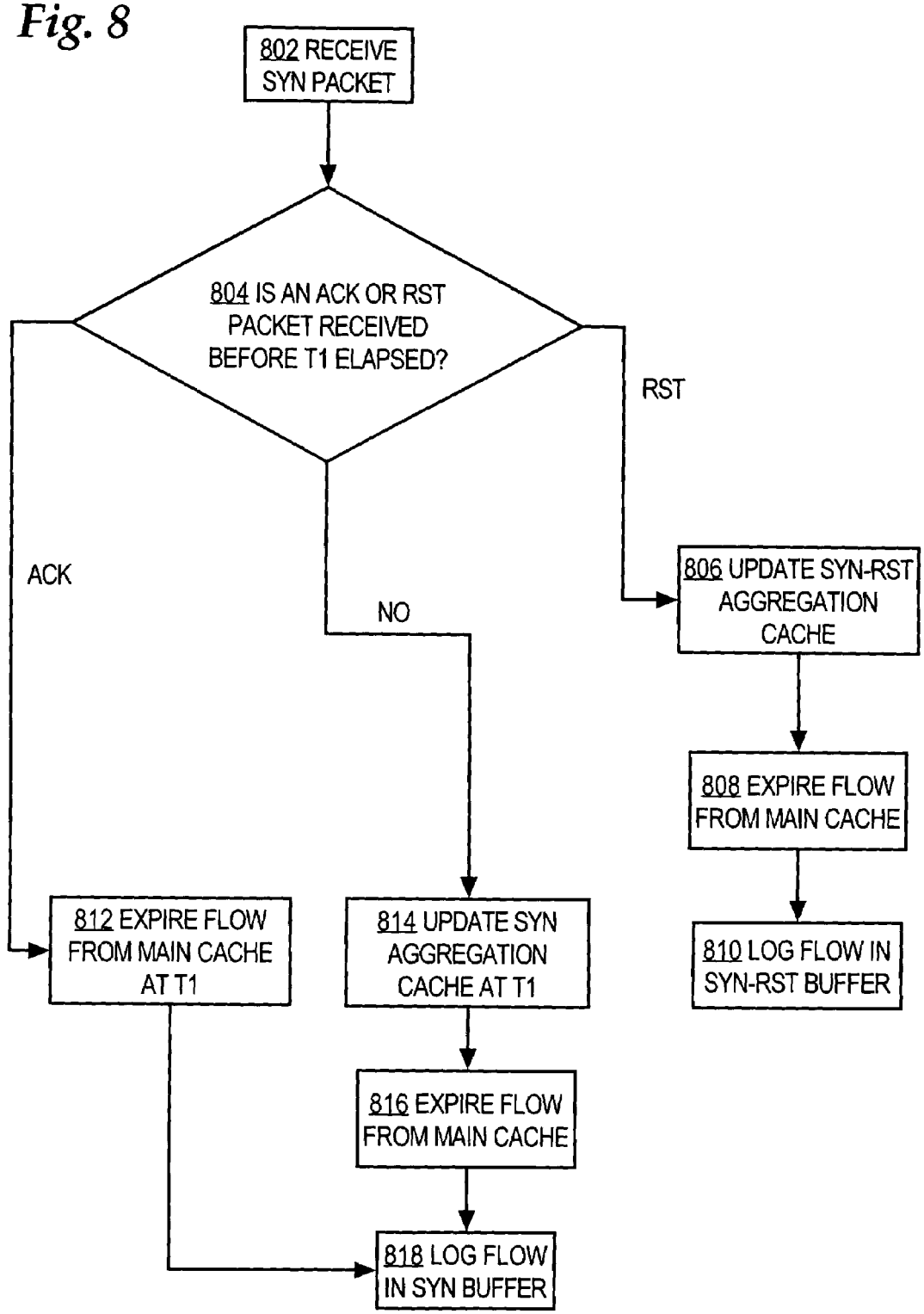
FIG. 8 is a flow diagram that illustrates an embodiment of a process for receiving SYN and SYN-RST flows and updating the SYN aggregation cache and SYN-RST aggregation cache, wherein the first timer and the global connection uptime value are equal.

FIG. 8 is a flow diagram illustrating an embodiment for the process of receiving SYN and SYN-RST flows and updating the SYN and SYN-RST aggregation caches, wherein T1 is equal to GCUT.

In step 802, router 104 receives a first SYN packet of a flow. Main cache 106 is updated to reflect the new packet. Router 104 waits for T1 to elapse from when the SYN packet was received in step 802. In step 804, router 104 determines if it received any ACK or RST packets before T1 elapsed. If a RST packet is received, then router 104 proceeds to steps 806, 808, and 810 in sequence, in which router 104 updates SYN-RST aggregation cache 110, expires the flow record from main cache 106, and logs the flow in SYN-RST buffer 114, respectively.

If the determination in step 804 is that an ACK packet was received, router 104 proceeds to step 812. In step 812, the flow record is expired from main cache 106. Then, in step 818, the flow is logged in SYN buffer 112. No update to SYN aggregation cache 108 is performed.

If the determination in step 804 is that router 104 received no ACK or RST packet before T1 elapsed, router 104 proceeds to step 814, in which router 104 updates SYN aggregation cache 108. Then, router 104 proceeds to steps 816 and 818 in sequence, in which the flow is expired from main cache 106 and the flow is logged in SYN buffer 112, respectively.

After the flow expires from main cache 106, any further received ACK or RST packets of the same flow are reflected in main cache 106 in new flow records, but otherwise no action is taken except for expiration of the new flow at the normal timeout.

If additional SYN packets of the same flow are received before the expiration of the flow, main cache 106 is still updated. But, for purposes of incrementing the packet counter of the corresponding aggregated flow in SYN aggregation cache 108, the extra SYN packets may be ignored.

Figure 9:
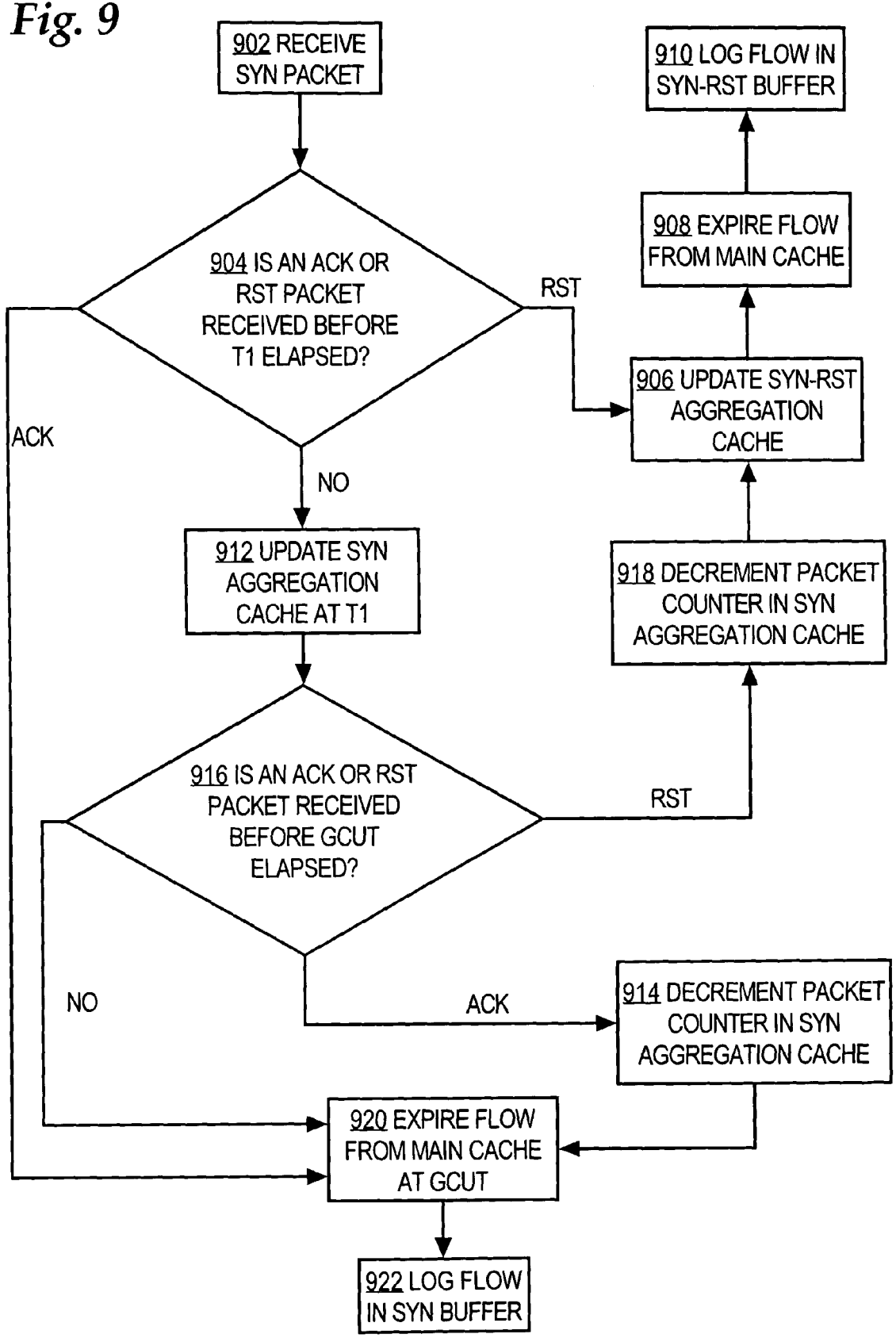
FIG. 9 is a flow diagram that illustrates an embodiment of a process for receiving SYN and SYN-RST flows and updating the SYN aggregation cache and SYN-RST aggregation cache, wherein the first timer is less than the global connection uptime value.

FIG. 9 is a flow diagram illustrating an embodiment for the process of receiving SYN and SYN-RST flows and updating the SYN and SYN-RST aggregation caches, wherein T1 is less than GCUT. In step 902, router 104 receives a SYN packet of a flow. Main cache 106 is updated to reflect the new packet. Router 104 waits for T1 to elapse from when the SYN packet was received in step 902. In step 904, router 104 determines if an ACK or RST packet of the same flow was received before T1 has elapsed. If the determination in step 904 is that a RST packet was received, router 104 proceeds to steps 906, 908, and 910 in sequence, in which router 104 updates SYN-RST aggregation cache 110, expires the flow from main cache 106, and logs the flow in SYN-RST buffer 114, respectively.

If the determination at step 904 is that an ACK packet was received, router 104 proceeds to step 920. In step 920, router 104 expires the flow once GCUT has elapsed from when the SYN packet was received in step 902. In step 922, router 104 logs the flow in SYN buffer 110.

If the determination at step 904 is that no ACK or RST packet was received, then in step 912, router 104 updates SYN aggregation cache 108.

In the process as shown in FIG. 9, a SYN flow expires from the main cache at GCUT. This is after T1, when an update of SYN aggregation cache 108 is scheduled to execute for the flow. After T1, the flow is already updated in SYN aggregation cache 108 as a SYN flow. But, there is a period of time between T1 and GCUT, when an ACK or RST packet of the same flow may be received. If that is the case, a corrective action needs to be taken to undo the update of SYN aggregation cache that took place at T1. That corrective action is to decrement the packet counter for the corresponding aggregated flow in SYN aggregation cache 108. Thus, after step 912, in step 916, router 104 determines if an ACK or RST packet was received before GCUT elapsed.

If the determination in step 916 is that an ACK packet was received, router 104 proceeds to step 914, where the packet counter of the corresponding aggregated flow in SYN aggregation cache 108 is decremented. From step 914, router 104 proceeds to steps 920 and 922 in sequence, in which the flow is expired from main cache 106 and logged in SYN buffer 112, respectively.

If the determination in step 916 is that an RST packet was received, router 104 proceeds to step 918, where the packet counter of the corresponding aggregated flow in SYN aggregation cache 108 is decremented. From step 918, router 104 proceeds to steps 906, 908, and 910 in sequence.

If the determination in step 916 is that no packet was received, router 104 proceeds to steps 920 and 922 in sequence.

After the flow expires from main cache 106, ACK or RST packets of the same flow received are reflected in main cache 106 in new flow records but otherwise no action is taken except for expiration of the new flow at the normal timeout.

If additional SYN packets of the same flow are received before the expiration of the flow, main cache 106 is still updated. But, for purposes of incrementing the packet counter of the corresponding aggregated flow in SYN aggregation cache 108, the extra SYN packets may be ignored.

3.4 Comparing the Packet and Flow Counters Against Specified Thresholds

In one embodiment, router 104, aside from receiving flows and updating aggregation caches, also compares the packet counters or flow counters of each aggregated flow in SYN aggregation cache 108 or SYN-RST aggregated cache 110, respectively. The packet counters in SYN aggregation cache 108 are compared against a SYN packet count threshold. This threshold represents the minimum number of SYN packets destined for a particular destination address that would lead an user to suspect that the destination address is being attacked by a SYN-flood attack. The flow counters in SYN-RST aggregation cache 110 are compared against a SYN-RST flow count threshold. This threshold represents the minimum number of SYN-RST flows or packet groups going to a destination address that would lead an user to suspect that the destination address is being attacked with a SYN-RST attack.

Both thresholds may be configurable by the user. Both comparison operations may be performed asynchronously from the process of receiving flows and updating the aggregation caches, and/or from each other. Both comparison operations may be performed in a process running separately, in the background, from the process responsible for receiving flows and updating aggregation caches. Both comparisons may be performed at a regular interval.

Figure 10A:
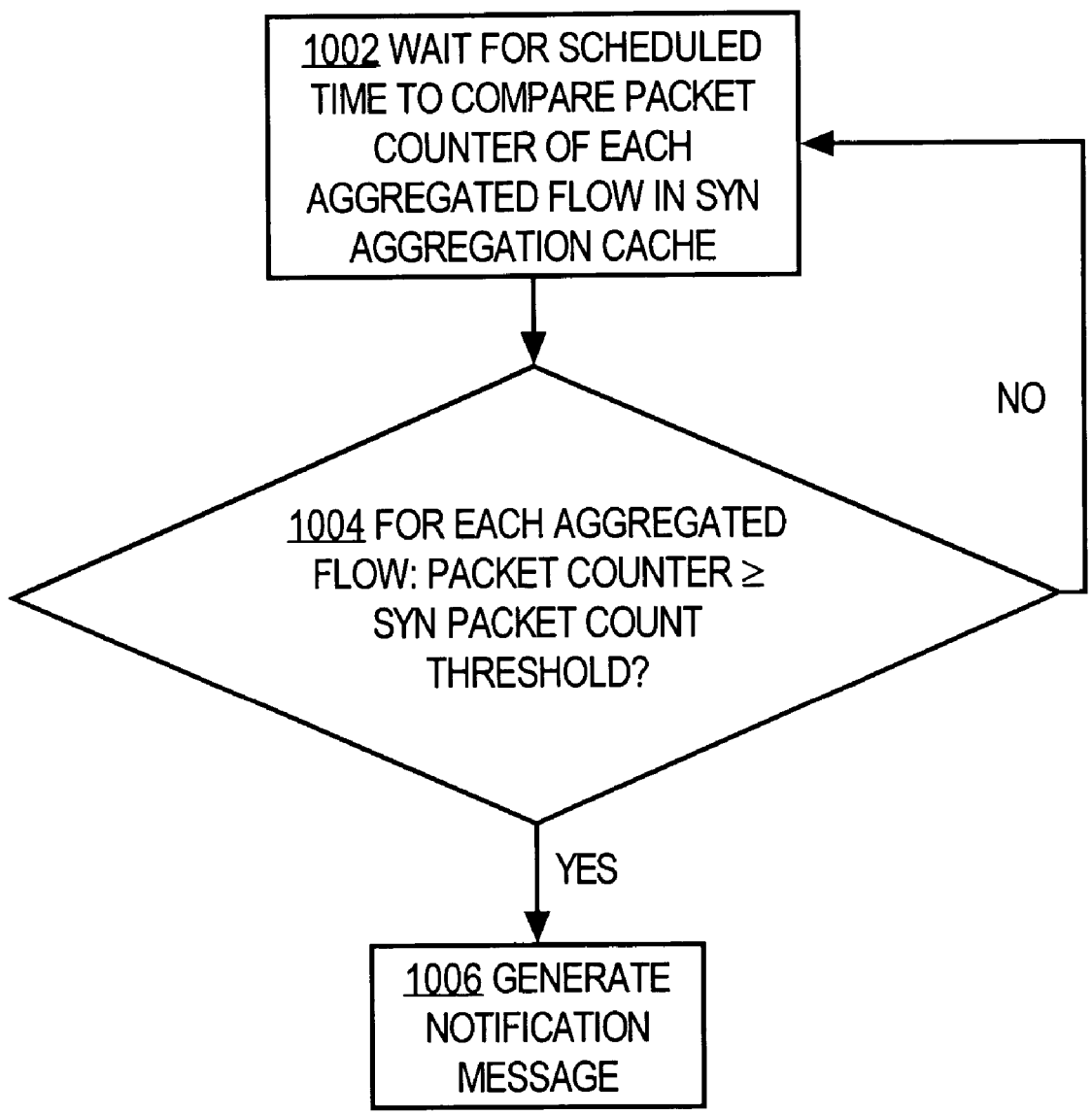
FIG. 10A is a flow diagram that illustrates an embodiment of a process for comparing the packet counters in the SYN aggregation cache.

FIG. 10A is a flow diagram illustrating an embodiment for the process of comparing the packet counters of each aggregated flow in SYN aggregation cache 108.

At step 1002, router 104 waits for the next scheduled time to compare the packet counters in SYN aggregation cache 108. When the scheduled time arrives, in step 1004 router 104 compares the packet count for each aggregated flow in SYN aggregation cache 108 against the SYN packet count threshold. If a packet count is greater than or equal to the threshold, in step 1006 router 104 generates a notification message to alert the user of suspicious packet flow activity at the destination address of the aggregated flow. If no packet count is greater than the threshold, then router 104 proceeds back to step 1002.

Figure 10B:
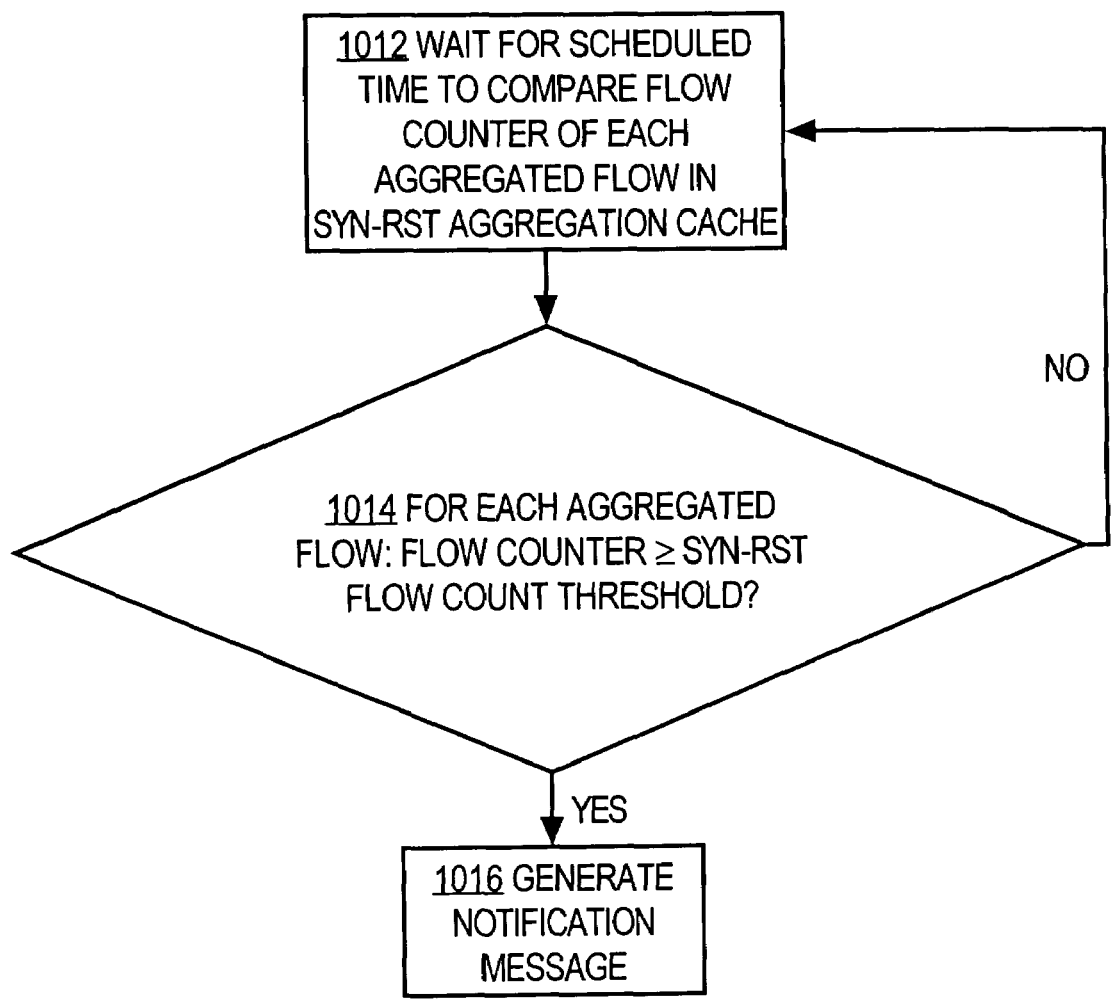
FIG. 10B is a flow diagram that illustrates an embodiment of a process for comparing the flow counters in the SYN-RST aggregation cache.

FIG. 10B is a flow diagram illustrating an embodiment for the process of comparing the flow counters of each aggregated flow in SYN-RST aggregation cache 110. In step 1012, router 104 waits for the next scheduled time to compare the flow counters in SYN-RST aggregation cache 110. When the scheduled time arrives, in step 1014 router 104 compares each flow count against the SYN-RST flow count threshold. If a flow count is greater than or equal to the threshold, in step 1016 router 104 generates a notification message to alert the user of suspicious packet flow activity at the destination address of the aggregated flow. If no flow count is greater than the threshold, then router 104 proceeds back to step 1010.

The notification message may be implemented as a Syslog or a Simple Network Management Protocol ("SNMP") trap. In the preferred embodiment, the message includes the destination address for which the packet counter or the flow counter exceeded a threshold. The notification message may include other information such as source address, source port, destination port, protocol, the packet counter, the flow counter, and other information that may assist the user in taking appropriate action or in further analysis. The information to be included in the notification message may be extracted from SYN aggregation cache 108, SYN-RST aggregation cache 110, SYN buffer 112, or SYN-RST buffer 114.

4.0 Implementation Mechanisms—Hardware Overview

Figure 11:
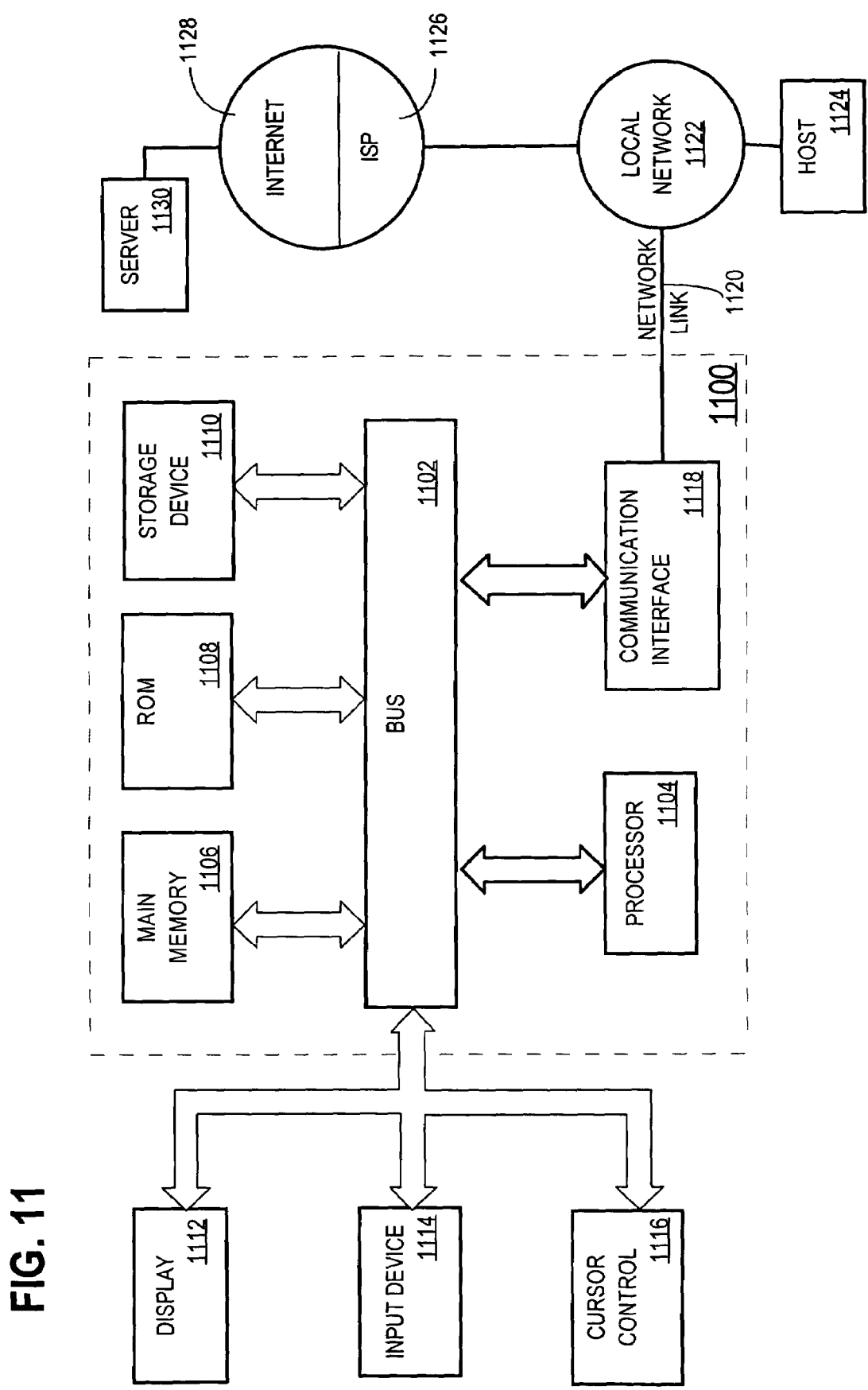
FIG. 11 is a block diagram that illustrates a computer system upon which an embodiment may be implemented.

FIG. 11 is a block diagram that illustrates a computer system 1100 upon which an embodiment may be implemented. The preferred embodiment is implemented using one or more computer programs running on a network element such as a router device. Thus, in this embodiment, the computer system 1100 is a router.

Computer system 1100 includes a bus 1102 or other communication mechanism for communicating information, and a processor 1104 coupled with bus 1102 for processing information. Computer system 1100 also includes a main memory 1106, such as a random access memory (RAM), flash memory, or other dynamic storage device, coupled to bus 1102 for storing information and instructions to be executed by processor 1104. Main memory 1106 also may be used for storing temporary variables or other intermediate information during execution of instructions to be executed by processor 1104. Computer system 1100 further includes a read only memory (ROM) 1108 or other static storage device coupled to bus 1102 for storing static information and instructions for processor 1104. A storage device 1110, such as a magnetic disk, flash memory or optical disk, is provided and coupled to bus 1102 for storing information and instructions.

A communication interface 1118 may be coupled to bus 1102 for communicating information and command selections to processor 1104. Interface 1118 is a conventional serial interface such as an RS-232 or RS-422 interface. An external terminal 1112 or other computer system connects to the computer system 1100 and provides commands to it using the interface 1114. Firmware or software running in the computer system 1100 provides a terminal interface or character-based command interface so that external commands can be given to the computer system.

A switching system 1116 is coupled to bus 1102 and has an input interface 1114 and an output interface 1119 to one or more external network elements. The external network elements may include a local network 1122 coupled to one or more hosts 1124, or a global network such as Internet 1128 having one or more servers 1130. The switching system 1116 switches information traffic arriving on input interface 1114 to output interface 1119 according to predetermined protocols and conventions that are well known. For example, switching system 1116, in cooperation with processor 1104, can determine a destination of a packet of data arriving on input interface 1114 and send it to the correct destination using output interface 1119. The destinations may include host 1124, server 1130, other end stations, or other routing and switching devices in local network 1122 or Internet 1128.

The invention is related to the use of computer system 1100 for detecting SYN-flood and/or SYN-RST denial of service attacks. According to one embodiment of the invention, detection of SYN-flood and/or SYN-RST denial of service attacks are provided by computer system 1100 in response to processor 1104 executing one or more sequences of one or more instructions contained in main memory 1106. Such instructions may be read into main memory 1106 from another computer-readable medium, such as storage device 1110. Execution of the sequences of instructions contained in main memory 1106 causes processor 1104 to perform the process steps described herein. One or more processors in a multi-processing arrangement may also be employed to execute the sequences of instructions contained in main memory 1106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1104 for execution. Such a medium may take many forms, including but not limited to, non-volatile media, volatile media, and transmission media. Non-volatile media includes, for example, optical or magnetic disks, such as storage device 1110. Volatile media includes dynamic memory, such as main memory 1106. Transmission media includes coaxial cables, copper wire and fiber optics, including the wires that comprise bus 1102. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1104 for execution. For example, the instructions may initially be carried on a magnetic disk of a remote computer. The remote computer can load the instructions into its dynamic memory and send the instructions over a telephone line using a modem. A modem local to computer system 1100 can receive the data on the telephone line and use an infrared transmitter to convert the data to an infrared signal. An infrared detector coupled to bus 1102 can receive the data carried in the infrared signal and place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Communication interface 1118 also provides a two-way data communication coupling to a network link 1120 that is connected to a local network 1122. For example, communication interface 1118 may be an integrated services digital network (ISDN) card or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are exemplary forms of carrier waves transporting the information.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118. In accordance with the invention, one such downloaded application provides for detecting SYN-flood and/or SYN-RST denial of service attacks as described herein.

The received code may be executed by processor 1104 as it is received, and/or stored in storage device 1110, or other non-volatile storage for later execution. In this manner, computer system 1100 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

The threshold values (T1, GCUT, the SYN packet count threshold, the SYN-RST flow count threshold, and the SYN-RST packet count threshold) may vary depending on the time of day, to account for different patterns of network traffic throughout the day. In some embodiments, a table that is configurable by the user may be used to implement the varying threshold values. The table may contain the time of day for which a threshold value will begin to be effective and the threshold values themselves. The table may be used in conjunction with default threshold values that are also configurable by the user. The table may refer to the default values for certain times of the day, or the default values may be the effective values in the absence of specified values in the table for certain times of the day.

Further, if router 104 is configured to detect SYN-flood and SYN-RST DoS attacks for multiple domains or addresses, a table of threshold values for each domain may be used. The table may contain the domains or addresses to be monitored and the threshold values for each domain or address.

Further, if the user desires threshold values that vary by domain/address and by time, a matrix of threshold values may be used.

The method may provide for clearing of SYN aggregation cache 108 and SYN-RST aggregation cache 110. In certain embodiments, both caches have limited space. A consequence is that the caches may not be able to accept any more entries. The problem of limited space may be solved, in some embodiments, by clearing the caches. The clearing may be done at a regular interval. The clearing may also be conditional. For example, an aggregated flow may be cleared from an aggregation cache only if it has not been updated for a specified amount of time.

The embodiments of the invention, as described above, are compatible with version four of the Internet Protocol (IPv4). Currently, the standard for version 6 of the Internet Protocol (IPv6) is in development. As of this date, there is some uncertainty as to whether the TCP handshake process will remain the same when used in conjunction with IPv6.

If the TCP handshake process does remain the same when used in conjunction with IPv6, the embodiments of the invention is compatible with IPv6.

Aside from detecting SYN-flood or SYN-RST DoS attacks, embodiments of the invention may be used to monitor traffic patterns to specific nodes, or more specifically, patterns of access to specific nodes. An aggregated flow in SYN aggregation cache 108 is a good indicator of the total level of access to a node because the aggregated flow keeps a count of connection attempts (initiated by SYN packets) to the node.

With the functionality of access tracking in mind, several extensions may be implemented. One extension is the reporting of aggregated flow data from SYN aggregation cache 108 at a regular interval, regardless of whether any packet counter has exceeded the SYN packet count threshold or whether T1 or GCUT has elapsed. This will give the user a periodic report of activity at the nodes of interest.

Further, aggregated flow data from SYN aggregation cache 108 may be reported to the user whenever a flow expiration timer (e.g. the greater of T1 and GCUT) has elapsed. This may result in more frequent reporting of flow data than periodic reporting during times of heavy access.

In certain embodiments, a user may want to detect DoS attacks or monitor access by particular ports as well as particular addresses. To provide for this functionality, SYN aggregation cache 108 and SYN-RST aggregation cache 110 may aggregate flows based on additional criteria. For example, the caches may aggregate flows based on destination address and destination port. Thus, flows destined for a particular address and port are aggregated into one aggregated flow, while flows destined for the same address but a different port are aggregated into another aggregated flow. Other additional criteria, such as interface, may be used.

What is claimed is:

1. A method of detecting a suspicious packet flow in a packet-switched network, comprising the computer-implemented steps of:
  receiving a first packet of a flow in which a SYN bit but not an ACK or RST bit of a TCP header is set;
  incrementing a packet counter associated with a destination address of the flow if a specified first time has elapsed;
  determining if the packet counter associated with the destination address is greater than a specified threshold value; and
  generating a notification message when the packet counter has exceeded the threshold value.

2. A method as recited in claim 1, further comprising the step of:
  caching information identifying the packet flow in an aggregation cache that aggregates packet flows based on destination address.

3. A method as recited in claim 1, wherein:
  the incrementing step is not performed if a second packet of the flow in which an ACK bit of the TCP header is set is received before the specified first time has elapsed.

4. A method as recited in claim 1, further comprising the step of:
  expiring the flow from a network flow data cache when the first time has elapsed.

5. A method as recited in claim 1, further comprising the steps of:
  receiving a second packet of the flow in which a RST bit of the TCP header is set;
  determining a time difference between when the first packet was received and when the second packet was received;
  incrementing a flow counter associated with the destination address of the flow if the time difference is less than a specified global connection uptime value;
  determining if the flow counter associated with the destination address is greater than a specified threshold value; and
  generating a notification message when the flow counter has exceeded the threshold value.

6. A method as recited in claim 5, further comprising the steps of:
  counting a number of packets received in the flow between the first packet and the second packet;
  determining whether the number of packets is less than a specified minimum threshold value;
  incrementing the flow counter if the number of packets is less than the threshold value.

7. A method as recited in claim 6, further comprising the step of:
  caching information identifying the packet flow in an aggregation cache that aggregates packet flows based on destination address if the number of packets is less than the specified minimum threshold value.

8. A method as recited in claim 6, further comprising the step of:
  expiring the flow from a network flow data cache if the time difference is less than the specified global connection uptime value or if the number of packets is less than the specified minimum threshold value.

9. A method as recited in claim 5, wherein the message further comprises:
  a source address, source port, protocol, destination port, and destination address of the flow;
  the flow counter; and
  the time difference.

10. A method as recited in claim 5, further comprising the step of:
  caching information identifying the packet flow in an aggregation cache that aggregates packet flows based on destination address if the time difference is less than the specified global connection uptime value.

11. A method as recited in claim 5, further comprising the step of:
  expiring the flow from a network flow data cache when a second time that is equal to the greater of the first time and the global connection uptime value has elapsed.

12. A method as recited in claim 5, further comprising the step of:
  expiring the flow from a network flow data cache if the time difference is less than the specified global connection uptime value.

13. A method of detecting a suspicious packet flow in a packet-switched network, comprising the computer-implemented steps of:
  receiving a first packet of a flow in which a SYN bit but not an ACK or RST bit of a TCP header is set;
  receiving a second packet of the flow in which a RST bit of the TCP header is set;
  determining a time difference between when the first packet was received and when the second packet was received;
  incrementing a flow counter associated with the destination address of the flow if the time difference is less than a specified global connection uptime value;

determining if the flow counter associated with the destination address is greater than a specified threshold value; and generating a notification message when the flow counter has exceeded the threshold value.

14. A method as recited in claim 13, further comprising the steps of:
counting a number of packets received in the flow between the first packet and the second packet;
determining whether the number of packets is less than a specified minimum threshold value;
incrementing the flow counter if the number of packets is less than the threshold value.

15. A method as recited in claim 14, further comprising the step of:
caching information identifying the packet flow in an aggregation cache that aggregates packet flows based on destination address if the number of packets is less than the specified minimum threshold value.

16. A method as recited in claim 14, further comprising the step of:
expiring the flow from a network flow data cache the time difference is less than the specified global connection uptime value or if the number of packets is less than the specified minimum threshold value.

17. A method as recited in claim 13, wherein the message further comprises:
a source address, source port, protocol, destination port, and destination address of the flow;
the flow counter; and
the time difference.

18. A method as recited in claim 13, further comprising the step of:
caching information identifying the packet flow in an aggregation cache that aggregates packet flows based on destination address if the time difference is less than the specified global connection uptime value.

19. A method as recited in claim 13, further comprising the step of:
expiring the flow from a network flow data cache if the time difference is less than the specified global connection uptime value.

20. A method of detecting a suspicious packet flow in a packet-switched network, comprising the computer-implemented steps of:
receiving, at a router, a first packet of a flow in which a SYN bit but not an ACK or RST bit of a TCP header is set;
incrementing a packet counter stored at the router and associated with a destination address of the flow if a specified first time has elapsed;
determining if the packet counter associated with the destination address is greater than a specified threshold value; and
generating a notification message when the packet counter has exceeded the threshold value.

21. A method as recited in claim 20, further comprising the step of:
caching information identifying the packet flow in a NetFlow aggregation cache stored at the router that aggregates packet flows based on destination address.

22. A method as recited in claim 20, wherein:
the incrementing step is not performed if a second packet of the flow in which an ACK bit of the TCP header is set is received before the specified first time has elapsed.

23. A method as recited in claim 20, further comprising the step of:
expiring the flow from a NetFlow cache stored at the router when the first time has elapsed.

24. A method as recited in claim 20, further comprising the steps of:
receiving, at the router, a second packet of the flow in which a RST bit of the TCP header is set;
determining a time difference between when the first packet was received and when the second packet was received;
incrementing a flow counter stored at the router and associated with the destination address of the flow if the time difference is less than a specified global connection uptime value;
determining if the flow counter associated with the destination address is greater than a specified threshold value; and
generating a notification message when the flow counter has exceeded the threshold value.

25. A method as recited in claim 24, further comprising the steps of:
counting a number of packets received at the router in the flow between the first packet and the second packet;
determining whether the number of packets is less than a specified minimum threshold value;
incrementing the flow counter if the number of packets is less than the threshold value.

26. A method as recited in claim 25, further comprising the step of:
caching information identifying the packet flow in a NetFlow aggregation cache stored at the router that aggregates packet flows based on destination address if the number of packets is less than the specified minimum threshold value.

27. A method as recited in claim 25, further comprising the step of:
expiring the flow from a NetFlow cache stored at the router if the time difference is less than the specified global connection uptime value or if the number of packets is less than the specified minimum threshold value.

28. A method as recited in claim 27, further comprising the step of:
expiring the flow from a NetFlow cache stored at the router if the time difference is less than the specified global connection uptime value or if the number of packets is less than the specified minimum threshold value.

29. A method as recited in claim 24, wherein the message further comprises:
a source address, source port, protocol, destination port, and destination address of the flow, wherein the source address and the destination address are Internet Protocol (IP) addresses;
the flow counter; and
the time difference.

30. A method as recited in claim 24, further comprising the step of:
caching information identifying the packet flow in a NetFlow aggregation cache stored at the router that aggregates packet flows based on destination address if the time difference is less than the specified global connection uptime value.

31. A method as recited in claim 24, further comprising the step of:

expiring the flow from a NetFlow cache stored at the router when a second time that is equal to the greater of the first time and the global connection uptime value has elapsed.

32. A method as recited in claim 24, further comprising the step of:
   expiring the flow from a NetFlow cache stored at the router if the time difference is less than the specified global connection uptime value.

33. A method of detecting a suspicious packet flow in a packet-switched network, comprising the computer-implemented steps of:
   receiving, at a router, a first packet of a flow in which a SYN bit but not an ACK or RST bit of a TCP header is set;
   receiving, at the router, a second packet of the flow in which a RST bit of the TCP header is set;
   determining a time difference between when the first packet was received and when the second packet was received;
   incrementing a flow counter stored at the router and associated with the destination address of the flow if the time difference is less than a specified global connection uptime value;
   determining if the flow counter associated with the destination address is greater than a specified threshold value; and
   generating a notification message when the flow counter has exceeded the threshold value.

34. A method as recited in claim 32, further comprising the steps of:
   counting a number of packets received at the router in the flow between the first packet and the second packet;
   determining whether the number of packets is less than a specified minimum threshold value;
   incrementing the flow counter if the number of packets is less than the threshold value.

35. A method as recited in claim 33, wherein the message further comprises:
   a source address, source port, protocol, destination port, and destination address of the flow, wherein the source address and the destination address are Internet Protocol (IP) addresses;
   the flow counter; and
   the time difference.

36. A method as recited in claim 33, further comprising the step of:
   caching information identifying the packet flow in a NetFlow aggregation cache stored at the router that aggregates packet flows based on destination address if the time difference is less than the specified global connection uptime value.

37. A method as recited in claim 34, further comprising the step of:
   caching information identifying the packet flow in a NetFlow aggregation cache stored at the router that aggregates packet flows based on destination address if the number of packets is less than the specified minimum threshold value.

38. A method as recited in claim 33, further comprising the step of:
   expiring the flow from a NetFlow cache stored at the router if the time difference is less than the specified global connection uptime value.

* * * * *